United States Patent
Maron et al.

(10) Patent No.: US 6,848,756 B2
(45) Date of Patent: Feb. 1, 2005

(54) METHOD AND CONTROL SYSTEM FOR APPLYING DEFINED CLAMPING FORCES

(75) Inventors: Christof Maron, Kelkheim (DE); Hans-Jörg Wiehoff, Regensburg (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 0 days.

(21) Appl. No.: 10/221,702

(22) PCT Filed: Mar. 12, 2001

(86) PCT No.: PCT/EP01/02744
§ 371 (c)(1),
(2), (4) Date: Jan. 16, 2003

(87) PCT Pub. No.: WO01/68428
PCT Pub. Date: Sep. 20, 2001

(65) Prior Publication Data
US 2003/0150677 A1 Aug. 14, 2003

(30) Foreign Application Priority Data
Mar. 15, 2000 (DE) .......................... 100 12 453

(51) Int. Cl.$^7$ ................................ B60T 8/60
(52) U.S. Cl. ........................ 303/155; 303/20
(58) Field of Search .................. 188/156, 158, 188/181 T, 72.1; 303/3, 20, 112, 155; 701/70, 71, 78

(56) References Cited

U.S. PATENT DOCUMENTS 6,178,369 B1 * 1/2001 Bohm ........................ 303/20
6,217,131 B1 * 4/2001 Schanzenbach ............. 303/112
6,238,011 B1 * 5/2001 Heckmann ................. 303/20
6,422,659 B2 * 7/2002 Disser ...................... 303/20
6,435,625 B1 * 8/2002 Schwarz et al. ............. 303/20
2003/0014129 A1 * 1/2003 Weiberl et al. .............. 700/19

FOREIGN PATENT DOCUMENTS

| DE | 197 30 094 | 1/1999 |
| DE | 197 42 920 | 4/1999 |
| DE | 198 26 133 | 12/1999 |

* cited by examiner

Primary Examiner—Thomas Williams
(74) Attorney, Agent, or Firm—Honigman Miller Schwartz and Cohn LLP

(57) ABSTRACT

A method and a control system for applying defined clamping forces in a brake that is electrically operable by an actuator and includes a first friction surface and a second friction surface in between which a clearance is allowed, wherein the application the first friction surface against the second friction surface is determined, and wherein a static correlation exists between its actuating travel or, respectively, the actuator position and clamping force, and wherein values of the clamping force as well as of the actuator position measured by a clamping force sensor and a position sensor are determined. To optimize the time-consuming initialization of the sensors used to determine the clamping force and the actuator position and, respectively, to take into account the non-linear rigidity characteristic of the system the control concept, the present invention discloses having the correlation described by a mathematical model whose parameters are determined during actuation.

9 Claims, 4 Drawing Sheets

METHOD AND CONTROL SYSTEM FOR APPLYING DEFINED CLAMPING FORCES

TECHNICAL FIELD

The present invention generally relates to a method and a control system for applying defined clamping forces in a brake and more particularly relates a method and a control system for applying defined clamping forces in a electrically operable brake for automotive vehicles.

BACKGROUND OF THE INVENTION

International patent application WO 96/033010 discloses a disc brake that is preferably operable by means of an electric motor by way of a reducing gear system. The special features of the prior art brake involve that the rotor of the electric motor has an annular design and embraces the reducing gear system in a radial way. These measures allow considerably shortening the axial overall length of the actuating unit. The above-mentioned publication, however, does not provide any indication about how defined clamping forces can be applied in the operation of the state of the art brake.

The publication 'Electromechanical Brake System: Actuator Control Development Systems', SAE Technical Paper Series 970814, discloses a control system for the application of defined clamping forces in an electrically operable brake which is provided by a cascaded arrangement of several controllers. A clamping force sensor is provided to determine the actual value of the clamping force applied by the actuator, while a position sensor is used to determine the actuator position or the actuator speed, respectively. The offset value of the clamping force sensor is determined with the brake opened and then subtracted from the clamping force sensor value during the normal operation. In the prior art control system, the distance between the first friction surface (friction lining) and the second friction surface (brake disc) in the initial position of the system, meaning the so-called air gap, is determined indirectly in such a way that the position is chosen as a contact position and, respectively, as the position sensor offset, in which position the clamping force sensor value that is cleared of the offset falls under a predetermined threshold value.

The time-consuming initialization of the sensors (clamping force sensor, position sensor) used to determine the clamping force and the actuator position is considered as a shortcoming in the prior art control system. Further, the control concept does not take the non-linear characteristic curve of rigidity of the system into account.

BRIEF SUMMARY OF THE INVENTION

Therefore, an object of the present invention is to disclose a method and a control system permitting a reduction of the time necessary for the initialization of the sensors. To this end, it is appreciated for the actuator position to be determined in which the brake linings are just abutting on the brake disc, however, with brake force not yet transmitted at this moment. Another objective is to improve the control quality by taking the non-linear characteristic of rigidity into consideration.

According to the present method, this object is achieved in describing the correlation by a mathematical model whose parameters are determined during actuation.

To render the idea of the present invention more precise, it is arranged for that the correlation is illustrated by a polynomial of second order $F_{estimat} = a_2 * \phi^2 + a_1 * \phi + a_0$.

In a favorable aspect of the method of the present invention, the parameters of the polynomial are determined by means of the method of least squares.

It is especially advantageous that a recursive algorithm is used for determining the parameters.

In addition, it is especially suitable to weight the measured values with a forgetting factor for determining the parameters.

To determine the brake application the first derivative of the polynomial is evaluated in relation to the actuator position, with the actuator position being determined in which the first derivative of the polynomial in relation to the actuator position adopts the value zero.

With the parameters of the polynomial available, the functioning of the clamping force sensor can be tested in a simple fashion. To this end, e.g. the difference between the current clamping force sensor value and the clamping force value which results from the evaluation of the polynomial for the current actuator position is calculated, and the amount is checked with respect to a threshold value. If this difference exceeds the predefined threshold value, this indicates a defective clamping force sensor.

If the clamping force sensor is defective (this may possibly occur also with other monitoring provisions such as a mechanism for monitoring the exceeding of a limit value), it is possible to calculate a clamping force substitute value by means of the polynomial identified so far and the measured current actuator position, said substitute value safeguarding at least an emergency operation of the clamping force control.

The control system of the present invention for implementing the method explained hereinabove is generally comprised of:
a) a first controller (force/travel controller) to which signals representative of a clamping force nominal value and a clamping force actual value as well as signals representative of an actuator position actual value are sent as input quantities, the output quantity of said controller corresponding to an actuator speed nominal value;
b) a second controller (speed controller) that is connected downstream of the first controller and to which signals representative of the actuator speed nominal value and an actuator speed actual value are sent as input quantities, the output quantity of said controller corresponding to an actuator torque nominal value; as well as
c) a third controller (current controller) to which signals representative of the actuator torque nominal value and an actual value of the current to be supplied to the actuator are sent as input quantities, the output quantity of said controller representing a correcting variable for adjusting the actual value of the current to be supplied to the actuator.

The control system of the present invention is favorably characterized by the provision of a characteristic curve identification module, to which signals representative of the actual value of the position measured at the actuator as well as of the actual value of the clamping force measured at the actuator are sent as input quantities, the output quantities of the module representing signals representative of a clamping force sensor offset value, a position sensor offset value as well as the identified parameter of the polynomial, wherein the signal representative of the clamping force actual value is generated by subtracting the clamping force sensor offset value from the signal representative of the actual value of the clamping force measured at the actuator, and the signal representative of the actuator position actual value is generated by subtracting the position sensor offset value from the signal representative of the actual value of the position measured at the actuator.

In a favorable improvement of the control system of the present invention, the parameters of the identified polynomial are sent to the first controller for the purpose of linearization of the overall system.

DETAILED DESCRIPTION OF THE PREFERRED EMBODIMENTS

Figure 1:
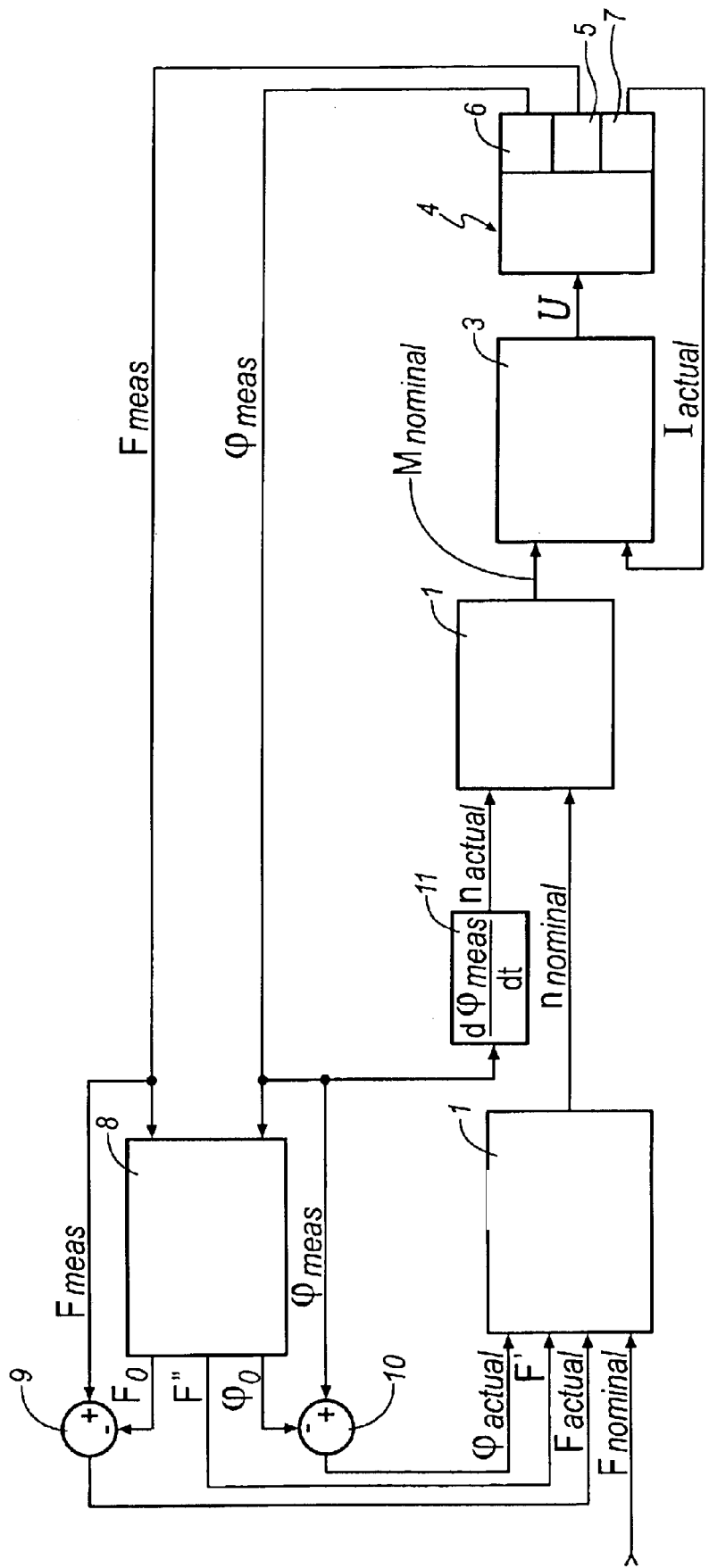
FIG. 1 is a design of a control system for implementing the method of the present invention.

The control system illustrated in FIG. 1 is generally comprised of a first controller or force/travel controller 1, a characteristic curve identification module 8 connected upstream of the force/travel controller 1, a second controller or speed controller 2 connected downstream of the force/travel controller 1, as well as a third controller or current controller 3 connected downstream of the speed controller 2, with an integrated servo booster generating a voltage U that is applied to an actuator 4 (only represented) of an electromechanically operable brake. The actuator 4 is preferably equipped with a clamping force sensor 5, a position measuring system 6 and a current sensor 7, with an output signal $F_{meas}$ of the clamping force sensor 5 representative of the measured clamping force being sent as a first input quantity to the characteristic curve identification module 8 and an output signal $\phi_{meas}$ of the position measuring system 6 representative of the measured actuator position being sent as a second input quantity to the characteristic curve identification module 8. The signal $I_{actual}$ of the current sensor 7 that corresponds to the actuator current actual value is sent as an input quantity to the current controller 3 mentioned hereinabove.

Further, it can be taken from FIG. 1 that a first output quantity $F_0$ of the characteristic curve identification module 8 that corresponds to a force sensor offset value is subtracted in a first subtraction point 9 from the above-mentioned measured clamping force $F_{meas}$, and the result of the subtraction, meaning a clamping force actual value $F_{actual}$, is sent as a first input quantity to the force/travel controller 1. A second output quantity $\phi_0$ of the characteristic curve identification module 8, which quantity corresponds to a position offset value, is subtracted in a second subtraction point 10 from the output signal $\phi_{meas}$ representative of the above-mentioned measured actuator position, and the result of the subtraction, meaning an actuator position actual value $\phi_{actual}$, is sent as a second input quantity to the force/travel controller 1. Besides, the gradient of the characteristic curve $dF/d\phi=F'$ is calculated in the characteristic curve identification module 8 and sent as a third input quantity to the force/travel controller 1, while a predetermined clamping force nominal value $F_{nominal}$ predetermined by the vehicle operator represents a fourth input quantity of the force/travel controller 1.

The input quantities of the speed controller 2 are the output quantity of the force/travel controller 1 that corresponds to the actuator speed nominal value $n_{nominal}$, and an actuator speed actual value $n_{actual}$ which is produced in a differentiator 11 by differentiation of the above-mentioned signal $\phi_{meas}$ that corresponds to the measured actuator position as a function of time. The output quantity of the speed controller 2 corresponds to a nominal value $M_{nominal}$ of the brake torque generated by actuator 4.

The mode of operation of the control circuit illustrated in FIG. 1 and, respectively, the implementation of the method of the present invention will be explained in detail in the following text by making reference to the accompanying drawings of FIGS. 2 to 4.

Figure 2:
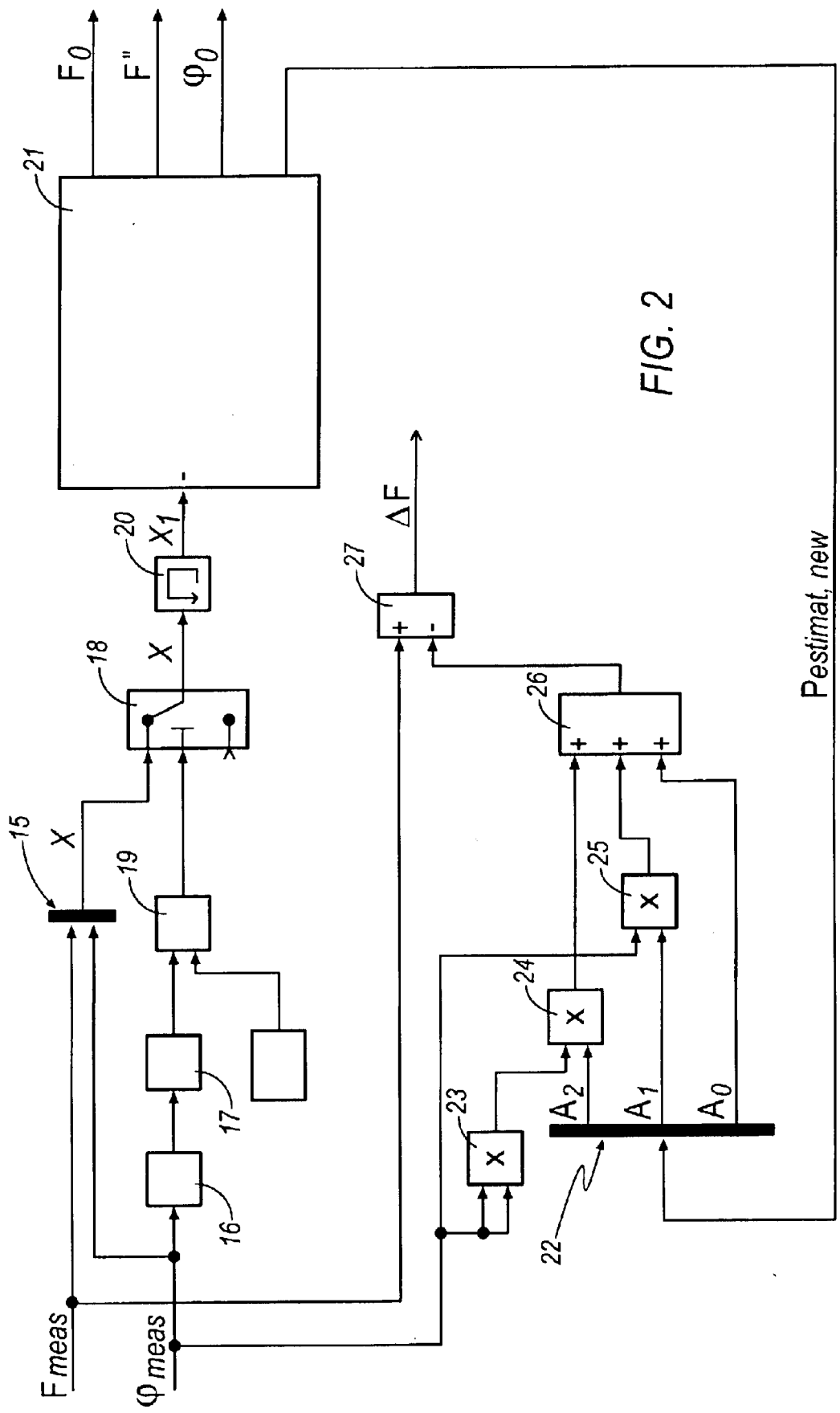
FIG. 2 is the design of a characteristic curve identification module used in the control system of FIG. 1.

As has already been mentioned, FIG. 2 shows the design of the characteristic curve identification module 8 with the input quantities $F_{meas}$, $\phi_{meas}$. Both scalar values $F_{meas}$, $\phi_{meas}$ are sent to a vector forming element 15 wherein a vector X is formed from the values and sent to a switch 18. Additionally, the signal $\phi_{meas}$ that corresponds to the measured actuator position is differentiated in a second differentiator 16 as a function of time, and the differentiated value $d\phi/dt=\dot{\phi}$ is sent to an amount computing element 17. The absolute value $|\dot{\phi}|$ is compared in a comparator 19 with a freely selectable threshold value $\dot{\phi}_{max}$ of symbolic notation. When the comparison executed in comparator 19 shows that the inequation $|\dot{\phi}| \leq \dot{\phi}_{max}$ is satisfied, the above-mentioned measurement vector X is conducted by the switch 18 and sent to a memory 20 for the intermediate storage of X-values. It is achieved thereby that only measurement vectors are included in the estimation that indicate a relatively slow movement of the brake actuator. This is because the characteristic curve pictures a static correlation that possibly permits an only very inexact estimation with rapid movements of the actuator.

The above-mentioned quantities $F_0$, $F'$, $\phi_0$ as well as a parameter vector $P_{estimat,new}$ is calculated in a calculation module 21 from the measurement vectors X1 stored in memory 20 by means of a recursive estimating process. The parameter vector $P_{estimat,new}$ is separated into parameters $a_2$, $a_1$, $a_0$ in a scalar producing element 22, said parameters being taken into account for producing a polynomial of second order $a_2\phi^2+a_1\phi+a_0$ illustrating the estimated clamping force $F_{estimat}$. The corresponding terms are produced in multipliers 23, 24, 25 for this purpose and sent to a summing element 26 having an output quantity $F_{estimat}$ that is subtracted from the above-mentioned quantity $F_{meas}$ in a subtraction point 27 for producing a clamping force difference value $\Delta F$. The clamping force difference value $\Delta F$ can be used to monitor the clamping force sensor, while $F_{estimat}$ is used as a clamping force substitute value when the clamping force sensor fails.

Figure 3:
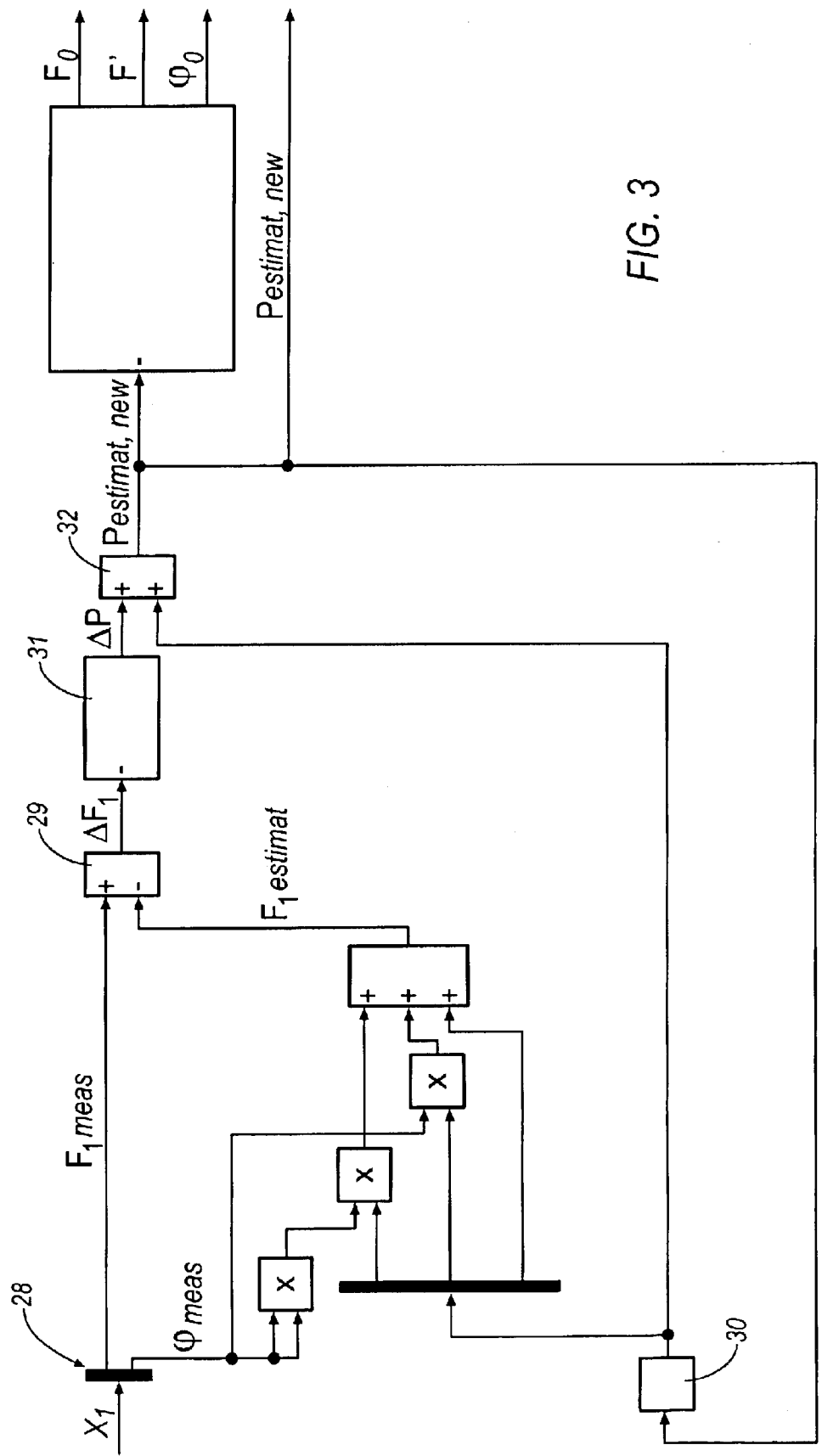
FIG. 3 is the design of a calculation module contained in the characteristic curve identification module of FIG. 2 and used for calculating the designed controlled quantities.

FIG. 3 shows the design of the calculating module 8 as illustrated in FIG. 2, with the stored measurement vector X1 as input quantity. The measurement vector X1 is initially sent to a scalar producing element 28 wherein it is separated into two scalar values $F1_{meas}$ and $\phi_{1meas}$. While the scalar value $F1_{meas}$ is sent directly to a subtraction point 29, the signal $\phi_{1meas}$ is used to produce a polynomial of second order $a_2\phi_{1meas}^2+a_1\phi_{1meas}+a_0$ representative of the estimated clamping force $F1_{estimat}$, with the parameters of the polynomial being obtained by factorizing a parameter vector $P_{estimat,old}$ which is achieved by shifting the above-mentioned parameter vector $P_{estimat,new}$ 'backwards' by a scanning step what is executed in a time delay element 30. As the calculation of the mentioned polynomial corresponds to the procedure described with respect to FIG. 2, there is no need to explain it once more at this point. The scalar value $F1_{estimat}$ is subtracted from the above-mentioned quantity $F_{1meas}$ in the subtraction point 29, with the result of the subtraction, meaning the clamping force difference value $\Delta F_1$, being sent as an input quantity to a correction factor computing element 31 wherein a correction factor of the parameter vector is calculated in such a way that an optimally good consistency of the estimation with the measurement is achieved in the sense of the method of least squares of errors. The output quantity $\Delta P$ of the correction factor computing element 31 is added to the parameter vector $P_{estimat,old}$ in an addition point 32 to produce the above-mentioned parameter vector $P_{estimat,new}$ which is processed in a parameter conversion module 33 to achieve the quantities $F_0$, $F'$, $\phi_0$ explained in connection with FIG. 2.

Figure 4:
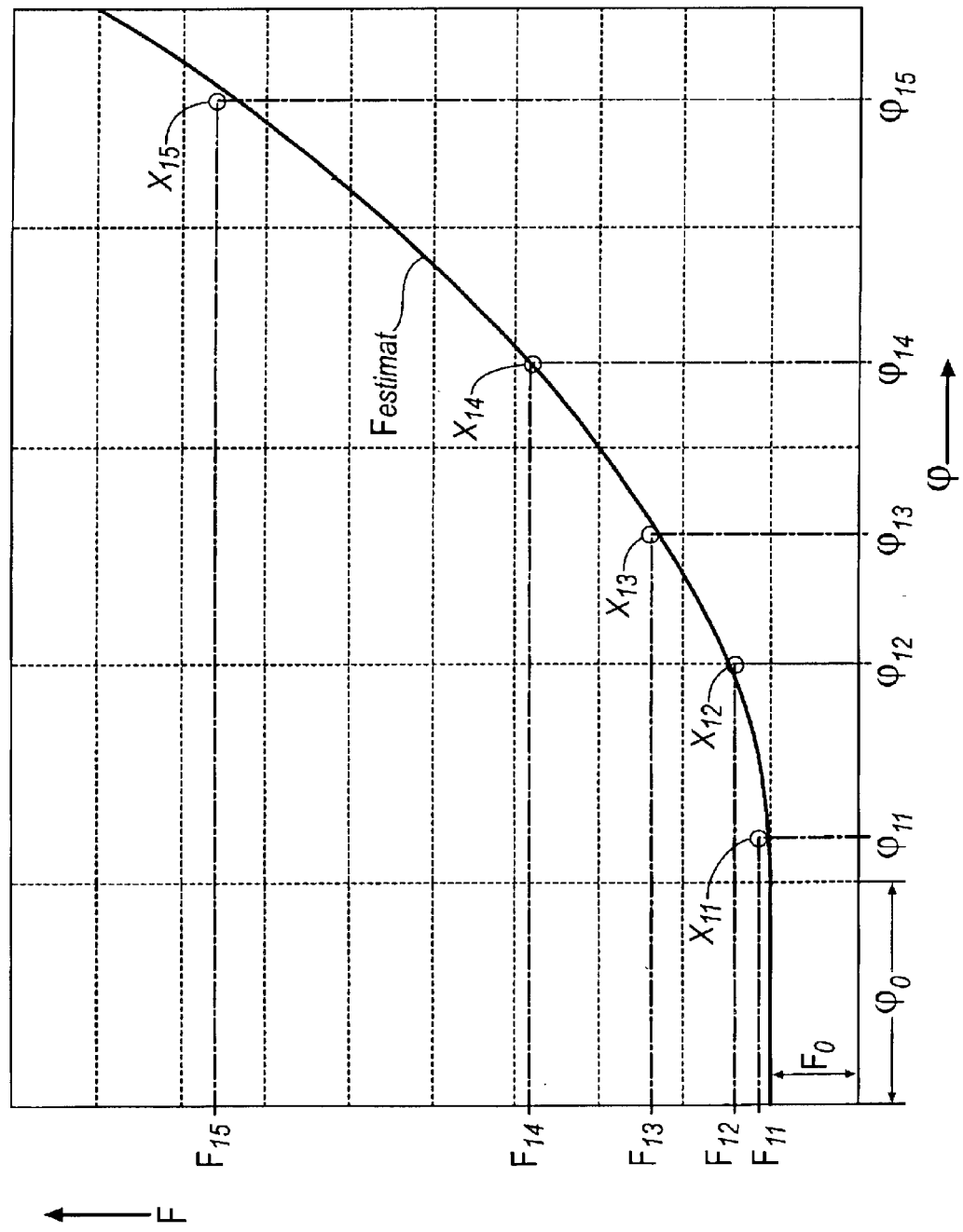
FIG. 4 is a diagram view of a characteristic curve for explaining the method of the present invention.

FIG. 4 eventually shows a diagrammatic view of the polynomial defining the estimated clamping force $F_{estimat}$. The individual points $X_{11}$ to $X_{15}$ correspond to the vector X1 referred to hereinabove at different values of the actuator position and the clamping force, while the plotted values $\phi_0$ and $F_0$, respectively, exhibit the position sensor offset value and the clamping force sensor offset value, respectively.

What is claimed is:

1. Method of applying clamping forces in a brake system that is electrically operable by means of an actuator and includes a first friction lining and a brake disc, comprising the steps of:

defining a static correlation between an actuating travel of said actuator or, an actuator position and an actual actuator clamping force, and determining a measured clamping force value by way of a clamping force sensor value and a position sensor value, wherein the static correlation is defined by a mathematical model having parameters determined during actuation of said actuator, wherein the static correlation is represented by an estimated actuator clamping force value calculated by using a polynomial of second order: $F_{estimat}=a_2*\phi^2+a_1*\phi+a_0$, wherein a first derivative of the polynomial in relation to the actuator position is evaluated for detecting a brake application.

2. Method as claimed in claim 1, wherein the parameters ($a_2,a_1,a_0$) of the polynomial are determined by means of the method of least squares.

3. Method as claimed in claim 1, wherein a recursive algorithm is used for determining the parameters.

4. Method as claimed in claim 3, wherein the clamping force sensor value and position sensor value are weighted with a forgetting factor for determining the parameters.

5. Method as claimed in claim 1, wherein the actuator position is determined in which a first derivative of the polynomial in relation to the actuator position adopts a value zero.

6. Method as claimed in claim 1, wherein a clamping force comparison value is continually produced by means of the polynomial and a clamping force sensor error is inferred from an excessive difference between the actual actuator clamping force and the estimated actuator clamping force.

7. Method as claimed in claim 1, wherein a clamping force substitute value is substituted for the estimated actuator clamping value when a clamping force sensor fails.

8. Control system or applying defined clamping forces in a brake system that is electrically operable by means of an actuator and includes a firs friction surface and a second friction surface in between which a clearance is allowed, wherein the application of the first friction surface against the second friction surface is determined, and wherein a static correlation exist between the actuating travel of the actuator or, the position of the actuator and the actual clamping force of the actuator, comprising:

a clamping force savor for generating an actual clamping force value of the actuator, a position sensor for generating an actuator position value, a first, force/travel controller to which signals representative of a clamping force nominal value and the actual clamping force value as well as the actual actuator position value are sent as input quantities, wherein an output value of said controller corresponds to an actuator speed nominal value, a second, speed controller connected downstream of the first controller and to which signals representative of the actuator speed no nil value and an actual actuator speed value are sent as input quantities, the output quantity of said second controller corresponding to an actuator torque nominal value, a third, current controller connected downstream of the second controller and to which signals representative of the actuator torque nominal value and an actuator torque actual value of the current to be supplied to the actuator arm sent as input quantities, the output quantity of said third controller representing a correlating variable (U) for adjusting the actual value of the current to be supplied to the actuator, a characteristic curve identification module for receiving signals representative of the actual actuator position measured at the actuator as well as for receiving of the actual actuator force value measured at the actuator, wherein said characteristic curve identification module includes signals output quantities representing a force sensor offset value, a position sensor offset value as well as the gradient of a characteristic curve defining the correlation between the actuator position travel value or an actuator position value and the actual actuator clamping force, and wherein the signal representative of the actual actuator clamping force is generated by subtracting the clamping force sensor offset value from the signal representative of the actual value of the damping force measured at the actuator, and the signal representative of the actual actuator position value is generated by subtract the position sensor offset value from the signal representative of the actual value of the position measured at the actuator.

9. Control system as claimed in claim 8, wherein the correlation between the actuator position travel value or an actuator position value and the actual actuator clamping force is defined by parameters of a polynomial, wherein said polynomial parameters are sent to the first controller for the linearization of a characteristic curve of rigidity of the brake.

* * * * *

UNITED STATES PATENT AND TRADEMARK OFFICE
CERTIFICATE OF CORRECTION

PATENT NO. : 6,848,756 B2
DATED : February 1, 2005
INVENTOR(S) : Maron et al.

It is certified that error appears in the above-identified patent and that said Letters Patent is hereby corrected as shown below:

Column 6,
Line 3, change "includes a firs friction" to -- includes a first friction --.
Line 7, change "static correlation exist between" to -- static correlation exists between --.
Line 10, change "a clamping force savor for" to -- a clamping force sensor for --.
Line 24, change "the actuator speed no nil value" to -- the actuator speed nominal value --.
Line 32, change "actuator arm sent as" to -- actuator are sent as --.
Line 50, change "of the damping force" to -- of the clamping force --.

Signed and Sealed this

Twenty-eighth Day of June, 2005

JON W. DUDAS
*Director of the United States Patent and Trademark Office*